United States Patent
Salter et al.

(10) Patent No.: US 12,233,913 B2
(45) Date of Patent: Feb. 25, 2025

(54) AUTONOMOUS FOOTCHASE ASSISTANCE

(71) Applicant: FORD GLOBAL TECHNOLOGIES, LLC, Dearborn, MI (US)

(72) Inventors: Stuart C. Salter, White Lake, MI (US); Christopher Charles Hunt, Livonia, MI (US); Brendan F. Diamond, Grosse Pointe, MI (US); Matthew Cramer Mullen, New Hudson, MI (US); Douglas H. Randlett, Metamora, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 18/085,694

(22) Filed: Dec. 21, 2022

(65) Prior Publication Data
US 2024/0208544 A1  Jun. 27, 2024

(51) Int. Cl.
*B60W 60/00* (2020.01)

(52) U.S. Cl.
CPC ... *B60W 60/0025* (2020.02); *B60W 2420/403* (2013.01); *B60W 2420/54* (2013.01)

(58) Field of Classification Search
None
See application file for complete search history.

(56) References Cited

U.S. PATENT DOCUMENTS

| | | | |
|---|---|---|---|
| 9,884,621 B2 | 2/2018 | Tarte et al. | |
| 2018/0150076 A1* | 5/2018 | Shem Tov | G06Q 50/265 |
| 2018/0211186 A1 | 7/2018 | Rakah et al. | |
| 2019/0039616 A1 | 2/2019 | Leff Yaffe et al. | |
| 2019/0293443 A1* | 9/2019 | Kelly | G01C 21/3484 |
| 2020/0242552 A1* | 7/2020 | Sailer | G05D 1/0285 |
| 2020/0378771 A1* | 12/2020 | Beaurepaire | G06Q 30/0284 |
| 2021/0080589 A1* | 3/2021 | Febbo | G05D 1/0246 |
| 2022/0176999 A1 | 6/2022 | Golgiri et al. | |
| 2023/0263441 A1* | 8/2023 | Sheth | A61B 5/7465 340/539.12 |

* cited by examiner

*Primary Examiner* — James J Lee
*Assistant Examiner* — David Hatch
(74) *Attorney, Agent, or Firm* — Joseph Zane; Brooks Kushman P.C.

(57) ABSTRACT

A vehicle monitors an ongoing enforcement situation using one or more sensors provided to the vehicle and determines, based on the monitoring and sensor data of the one or more sensors, that a foot pursuit has begun. The vehicle receives a location signal from a location-providing device carried by at least one entity involved in the situation and determines a street route for the vehicle that follows movement of the entity by using streets travelable by the vehicle, based on a plurality of locations received from the location-providing device. Also, the vehicle automatically and autonomously controls the vehicle to follow the determined street route.

17 Claims, 4 Drawing Sheets

AUTONOMOUS FOOTCHASE ASSISTANCE

TECHNICAL FIELD

The illustrative embodiments generally relate to methods and apparatuses for autonomous footchase assistance.

BACKGROUND

When an officer effects a traffic stop, the officer typically exits the vehicle at some point in order to interact with the occupants of the stopped vehicle. This presents an opportune time for flight, as the officer must either return to a vehicle to provide chase or pursue on foot, leaving the enforcement vehicle behind.

In many instances, foot pursuit is the only option, as fleeing parties can quickly pass into areas unsuitable for travel. If the officer gives chase, however, they could end up a significant distance from their vehicle, so that even if an apprehension is effected, it is a difficult task to return the suspect to the vehicle, or the officer must wait for another vehicle to arrive and provide assistance. This increases the possibility of escape or other undesirable consequences. Further, an unattended enforcement vehicle may be undesirable as well, since the vehicle will often be unlocked as the officer did not intend to leave it behind.

If the officer has a partner, then the partner can drive the vehicle to meet the officer at a point of apprehension or a pickup point, but when such a second party is not present, the officer must make a split second decision to pursue, lest the suspect be lost, and that decision is subject to the preceding issues.

SUMMARY

In a first illustrative embodiment, a vehicle includes one or more processors configured to monitor an ongoing enforcement situation using one or more sensors provided to the vehicle and determine, based on the monitoring and sensor data of the one or more sensors, that a foot pursuit has begun. The one or more processors are also configured to receive a location signal from a location-providing device carried by at least one entity involved in the situation and determine a street route for the vehicle that follows movement of the entity by using streets travelable by the vehicle, based on a plurality of locations received from the location-providing device. Also, the one or more processors are configured to automatically and autonomously control the vehicle to follow the determined street route.

In a second illustrative embodiment, a non-transitory computer-readable storage medium stores instructions that, when executed by a vehicle computer including one or more processors, cause the one or more processors to monitor an ongoing enforcement situation using one or more sensors provided to the vehicle and determine, based on the monitoring and sensor data of the one or more sensors, that a foot pursuit has begun. The one or more processors are also configured to receive a location signal from a location-providing device carried by at least one entity involved in the situation and determine a street route for the vehicle that follows movement of the entity by using streets travelable by the vehicle, based on a plurality of locations received from the location-providing device. Further, the one or more processors are configured to automatically and autonomously control the vehicle to follow the determined street route at no greater than a predetermined speed below one or more speed limits associated with one or more streets comprising the street route.

In a third illustrative embodiment, a method includes monitoring an ongoing enforcement situation using one or more sensors provided to a vehicle and determining, based on the monitoring and at least one of visual or audio sensor data of the one or more sensors, that a foot pursuit has begun. The method also includes receiving a location signal from a location-providing device carried by at least one entity involved in the situation and determining a street route for the vehicle that follows movement of the entity by using streets travelable by the vehicle, based on a plurality of locations received from the location-providing device. The method further includes automatically and autonomously controlling the vehicle to follow the determined street route.

BRIEF DESCRIPTION OF THE DRAWINGS

FIG. 4 shows an illustrative example of a tracking engagement process; and

DETAILED DESCRIPTION

Figure 1:
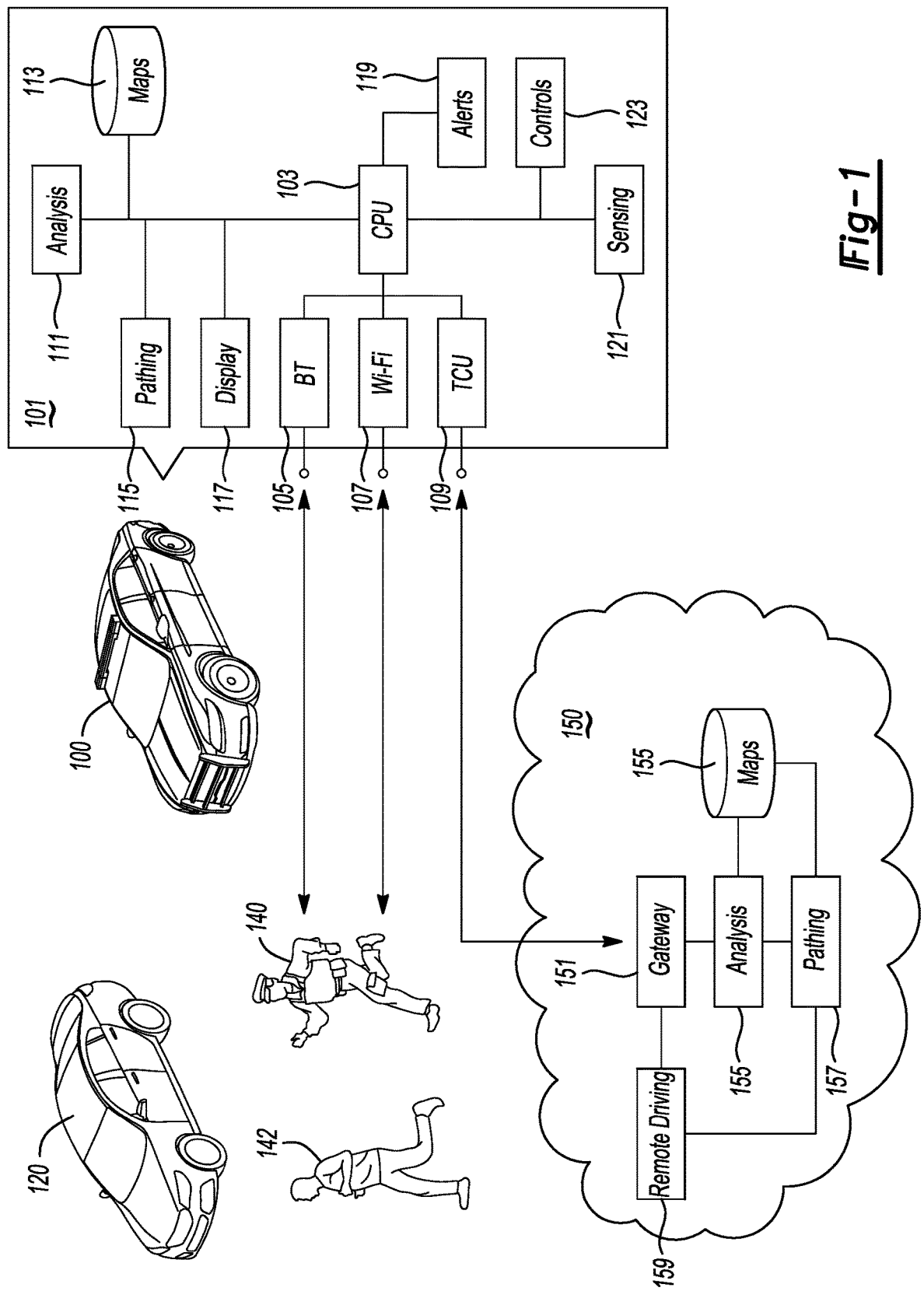
FIG. 1 shows an illustrative example of an enforcement vehicle capable of autonomous following.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose an enforcement vehicle capable of following an officer autonomously, at least to an extent possible by the vehicle traveling on areas suitable for vehicular travel, such as, but not limited to, roads. The vehicle may detect that an officer has begun a pursuit, and responsively lock its doors and engage any security systems. This step can help harden the vehicle against unwanted access while the officer is away, and the vehicle can immediately responsively unlock doors responsive to officer proximity (e.g., leading a person back to the vehicle or meeting up with the vehicle) and/or officer request.

When the officer can be closely followed because of, for example, roads adjacent to a footpath taken by the officer, then the vehicle can track and follow the officer at appropriate speeds, remaining in close proximity. When the officer's path takes the officer to an area not reasonably accessible by a vehicle (e.g., a backyard, a park with many trees or pedestrians, etc.), the vehicle can track officer vectors and attempt to intercept the officer's apparent path out of the area, by traveling to meeting points where travelable terrain permits. Whether the vehicle must remain on marked roads or vehicle areas (such as parking lots) or whether the vehicle can also travel offroad under certain conditions is a matter of design choice, it is contemplated that the vehicle can travel to any suitable location while maintaining appropriate travel speeds and sensor awareness of surrounding environments. The vehicle may also be remotely driven by a remote operator and provide sensor feed back (e.g., video, LIDAR, RADAR, etc.) to the remote operator for appropriate operation.

FIG. 1 shows an illustrative example of an enforcement vehicle capable of autonomous following. In this example, enforcement vehicle 100 includes an onboard computing system 101. This system includes one or more processors 103 in communication with a variety of possible connectivity transceivers. Connectivity, in the context of the illustrative embodiments, provides a role in allowing officers to communicate with vehicles, vehicles to track officers and relay officer communication, vehicles to communicate with each other, and vehicles to communicate with the cloud 150, among other things.

In this example, three types of illustrative communication mediums are shown. BLUETOOTH transceiver 105 allows for short range communication with an officer 140, as does Wi-Fi transceiver 107, depending on what devices are worn/carried by the officer 140. Wearables, such as body cameras or tracking devices, can be in communication with the vehicle 100 while in range, allowing for reporting of officer locations while an officer is in pursuit, as well as upload of video usable for analysis or reporting purposes. Officer mobile phones and other devices that commonly have GPS or other coordinate-system capability can also be used to track officers. Data from accelerometers and other sensors included in wearable devices can help determine officer travel vectors when an officer is moving through an area not delineated by streets, or when an officer is passing through non-street areas such as backyards and properties.

An analysis process 111 onboard the vehicle can perform several functions, including predicting an officer path, determining intercept points and determining when a chase has begun or ended. Map data 113 can provide information including roads, layout, topography and physical obstacles that would present impediments between a vehicle location (or planned vehicle location) and an officer location (or anticipated officer location). Comparable or even more powerful analysis process 153 can execute remotely from the vehicle 100, and can also access map data 155. Map data 155 may include live updates to data not available to the vehicle. Pathing process 157 may plan routes for the vehicle, predict officer movement, etc. This route data can also be fed into a remote driver process 159, to guide a remote driver driving a vehicle to follow the officer 140. Pathing can also occur onboard a vehicle via a comparable process 115 that determines the best route, speeds, etc. for a vehicle 100 to follow an officer 140 in foot pursuit. Communication to and from the cloud for pathing, analysis or control purposes can be facilitated by a gateway process 151 that handles communication requests and routing for many cloud functions, responses and data stores.

A vehicle display 117 can show the planned path and officer location, for use by a partner in the vehicle or for use by another officer. If there is an opportunity for the vehicle 100 to intercept a second officer, who can serve as a driver, such as a foot-patrol officer in the area of the chase, the vehicle 100 can plan an intercept route for that officer, unlock itself and let the officer enter based on identifying the officer (e.g., through visual or wireless signals, or a code input), and then show the officer where to drive and where the chasing-officer is located. Alerts 119 issued by alert process can include localized alerts to other officers such as above, alerts to other patrol vehicles via vehicle to vehicle (V2V) communication, and even externally output audio alerts announcing, for example, that a suspect should stop fleeing.

A vehicle can also attempt to position itself on the other side of a fleeing suspect and issue such an alert. For example, if a suspect is fleeing across a field, the vehicle may be able to reach the other side of the field before the suspect, and track the movement of the suspect using vehicle sensors 121. The vehicle 100 can place a spotlight on the suspect and further issue an instruction for the suspect to cease flight. If the suspect believes, for example, that the vehicle is manned, this may end the chase, since the suspect seems to be caught between two parties capable of effectuating an arrest, even though, in this example, the suspect could technically run right past the vehicle.

In other examples, if there is a narrow path through which the suspect must or is likely to flee (e.g., a path between buildings), the vehicle can act as a physical deterrent, by blocking the path like a mobile gate or barrier. This places the vehicle in a reasonable optimal position for officer access while also possibly slowing down the suspect. The vehicle can use automatic control functions 123 to open doors based on officer approach. The vehicle could also potentially open doors on a suspect side of the vehicle, when acting as an obstacle, in case the suspect was to attempt to pass through the vehicle, and then lock the other side and further lock the previously unlocked door if the suspect attempted to pass through the vehicle using the doors.

Figure 2:
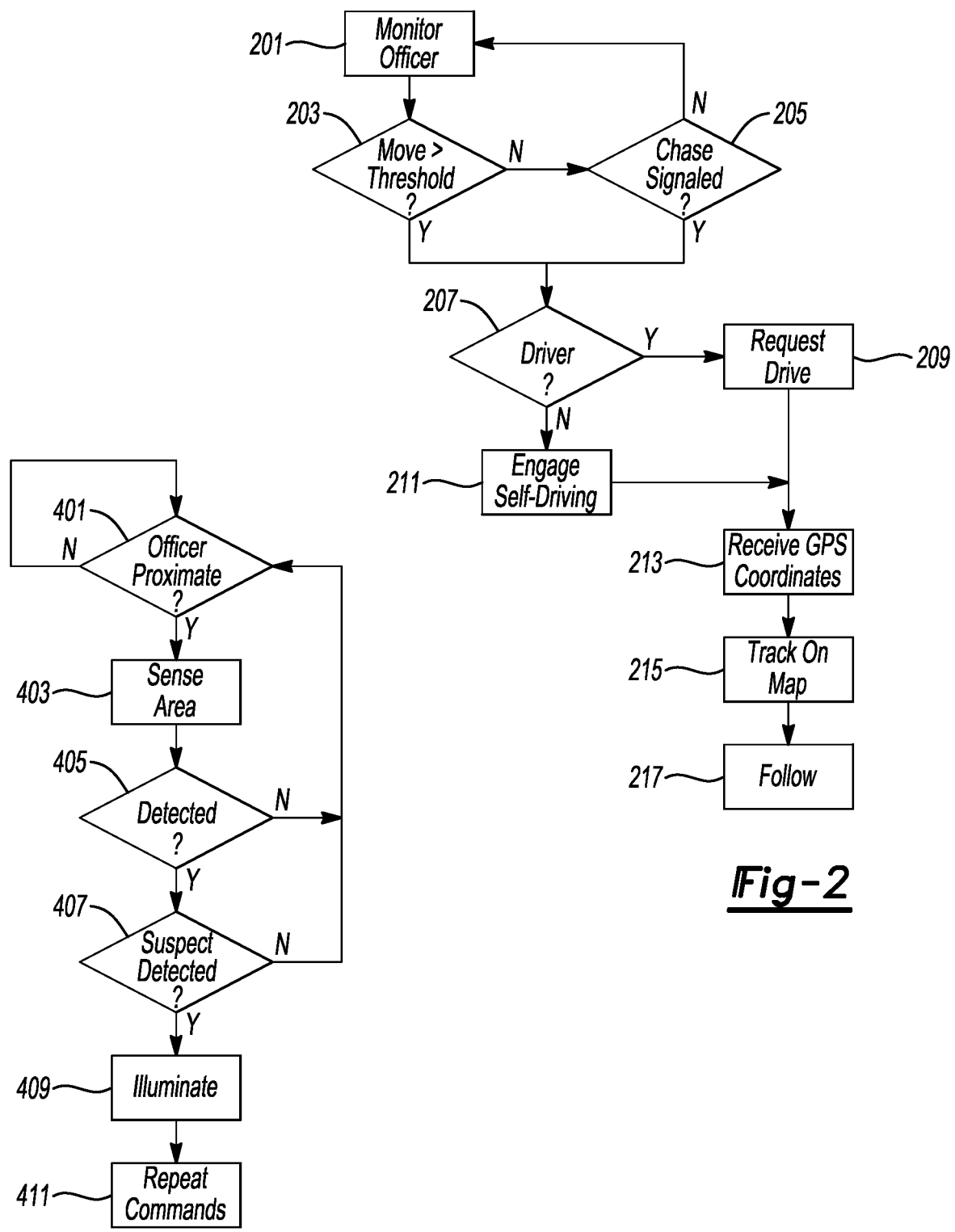
FIG. 2 shows an illustrative example of a follow process.

FIG. 2 shows an illustrative example of a follow process. In this example, the process will track an officer when the officer exits a vehicle, for example, monitoring at 201 for any behavior indicative of a situation to which the vehicle may be programmed to react. In this example, that includes determining if the officer engages in a foot pursuit, so the vehicle 100 can follow the officer and plan assistance.

If the officer begins to move at a speed above a threshold at 203, or if the officer signals that a pursuit has begun, such as through depression of a radio/device button or issuance of a statement or command inductive of a pursuit at 205, the process can engage a pursuit following protocol.

Determining a pursuit could be signaled by an officer stating the fact of the pursuit, e.g., "pursuing suspect at 5th and Main," or based on speech analysis indicating a likely pursuit based on officer commands, for example, e.g. "Stop running!" The vehicle can immediately engage locks and officer tracking processes, and the locks can also be immediately opened if the officer runs back to the vehicle to give chase, as opposed to pursuing the runner on foot.

If there is another possible driver in the vehicle at 207, such as a partner, the vehicle could indicate the chase condition at 209 and request that the partner drive the vehicle. If the vehicle were capable of self-driving, the vehicle could begin the pursuit while the partner moved from a passenger to driver area (while, for example, locking out manual steering or other controls to circumvent inadvertent steering during movement) and then pass control to the partner when the partner was situated and ready to begin manually driving.

If there was no one else present, the vehicle could engage a self-drive process at 211, which could include automatic control of the vehicle in certain directions or under certain parameters. Automatic control may occur at capped speeds to decrease chances of incident, but since most people are not capable of maintaining speeds of over 5-10 miles per hour when running for any significant period of time, the vehicle will not likely have to travel exceedingly quickly to maintain a reasonable proximity to the officer, unless the pursuit takes the officer into an area with a very wide perimeter, meaning the vehicle has significantly more perimeter ground to cover than an officer passing through the middle of the area. Even if the vehicle cannot maintain maximum proximity (e.g., travel at a maximum speed necessary to be as close as possible) due to incident concerns, the vehicle should still be able to maintain reasonable proximity by traveling at slower speeds, owing to the travel speed of humans on foot in general.

As the officer travels, the vehicle 100 could wirelessly receive officer location indicators or GPS coordinates at 213 and could use map data to track officer progress at 215. This can include identifying the most-proximate road locations (where a vehicle can easily travel) to the officer locations and planning a path to those locations. The pathing may also account for officer speeds and travel vectors, to prevent, for example, having the vehicle have to unnecessarily backtrack if a pursuit path seems to be carrying the officer towards a better meeting point than an intermittent meeting point at which the vehicle may arrive after the officer has already passed. The vehicle can use this data to follow the officer at 217.

As part of the follow process, the vehicle 100 may periodically get ahead of an officer location when anticipating a path. The vehicle can wait at such points, and even meet the officer during a chase, if re-entry into the vehicle would assist in the chase. An officer can also issue commands for a vehicle to stop and wait, or to meet the officer at a specific location (E.g., 7th and Howard, NW corner of the park, William's School parking lot, etc.). This allows the officer to at least partially summon the vehicle to a location during a pursuit. In other examples, the vehicle will plan such locations based on officer vectors, map data indicating possible paths, and likely arrival times of the vehicle and an officer.

Figure 3:
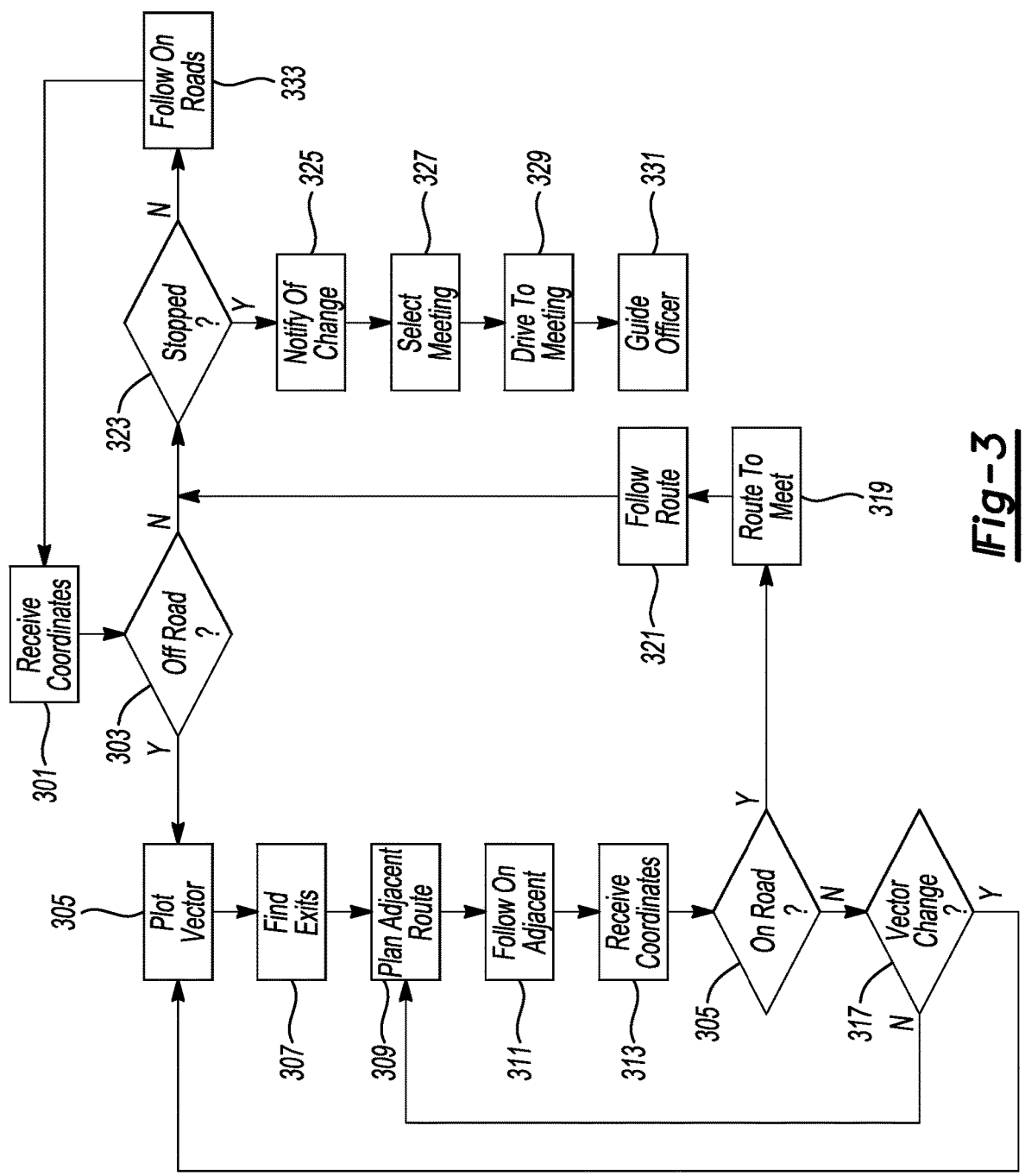
FIG. 3 shows an illustrative example of a tracking process.

FIG. 3 shows an illustrative example of a tracking process. In this example, the vehicle or a cloud process receives officer coordinates at 301, which can include transmission of coordinates from a wearable or from a carried-device, such as a wireless phone. If the current location is not "off-road" at 303 or if the officer is not stopped at 305 (indicated by, for example, sequential coordinate sets indicating little to no movement), then the process can instruct the vehicle 100 to follow the officer 140 using roads that are near or that will bring the vehicle near to the officer's position.

In this context, for example, off-road may not include pursuit on sidewalks and through front yards of houses, since those are areas visible from a street, even if the vehicle cannot or should not necessarily travel directly to those areas. Since a map may not always indicate what constitutes a sidewalk or front yard, the process may consider anything within 10 feet of a street edge to be "not off-road" for evaluation purposes. This is a non-limiting example for illustration only, and the paradigm for determining "off-road" travel can be suitably tuned to any environment.

If the officer moves to an off-road location at 303, the process can plot a travel vector at 305, using, for example, officer speeds and a series of coordinates. Ancillary data, such as a path through a park, may also be used to plot the vector, if preceding coordinate points indicate general adherence to the path, for example. The vector is plotted to determine one or more locations where the officer may next be located and to determine where and when the vehicle can meet the officer, if the vehicle is limited to street travel, for example.

The vehicle 100 may also find exits from an off-road area, which can either just be general open areas (e.g., an unimpeded edge of a park) or specific exits from a controlled area—e.g., a gated exit from a baseball field. Map data may include indications of such exits. These exits may represent points that are likely exit points for suspects and officers, and vector calculations may be modified in light of exit locations based on an assumption that a path will eventually lead towards an exit.

The vehicle may then plan a driving path to one or more exits, or to an area between exits if exit and vector analysis does not yield a likely enough result. For example, a vehicle could determine several vectors and several possible exit locations, and assign likelihoods or weights to each. Based on combined weightings, the vehicle could travel to an exit or closer to an exit having a higher weighting. If, for example, the vehicle predicted that 70 percent of vectors and decisions would lead to exit A and 30 percent to exit B, the vehicle could position itself between exit A and B, but closer to exit A. Or the vehicle could simply travel to the most probably meeting location. Again, since a vehicle can make up distance quickly relative to a human traveling on foot, the vehicle may not need to be precisely at the exit location, unless the vehicle is also serving as a physical impediment.

In another example, the vehicle could attempt to remain close to an officer by simply attempting to travel or planning travel along the roads most proximate to an officer location, without attempting to determine where the officer was headed. The vehicle 100 can travel along any planned path autonomously (in this example) at appropriate speeds. As the vehicle travels, it receives updated coordinates at 313 and determines if the officer has re-entered a "road" space at 315 or if the coordinates indicate a vector change at 317.

A vector change can be used to plan or weight exits differently and change a route, and an "on-road" condition for an officer, indicated by coordinates, presents an opportunity to meet the officer. The vehicle can plan an intercept route using roads at 319 and drive to the meeting location at 321. A choice of whether to travel behind the officer or to get ahead of the officer is up to a user. It may make sense to follow a path of the officer (in an attempt to catch up) because that path will eventually lead to the officer for any vehicle traveling even slightly faster than an officer. It may also make sense to attempt to plan a point ahead of the officer where the officer is likely to go, so that the vehicle will already be waiting and efficiencies in interconnected road networks can provide opportunities not afforded the officer on foot, who will likely be forced to follow whatever winding path the suspect takes.

Once the coordinates indicate the officer has stopped moving at 323, the process can notify the officer that the stop was detected at 325. This can include a silent or earpiece notification, in case the officer prefers not to have an audible radio announcement occur while the officer is searching for a suspect. If the officer confirms that the vehicle 100 is to meet the officer, because the suspect is in custody or has fled, for example, the vehicle 100 can select an appropriate meeting point based on the respective locations of the vehicle and officer at 327.

This point may be selected based on the relative travel speeds and pathing available to both the vehicle and the officer—e.g., vehicles can move faster, but generally travel on roads. Officers can cut through buildings and yards. The state of the officer may also be considered, if the officer is wounded, tired, or has a suspect in custody, the vehicle may attempt to do the bulk of or all of the traveling, even if this means a level of permissible off-road travel in order to assist the officer.

The vehicle 100 can drive to the meeting point at 329 and issue guidance to the officer at 331. The guidance can be monitored and executed by an officer device (such as a phone), which can act as independent guidance to a destination, or the vehicle may use received officer coordinates to guide the officer over wireless (e.g. radio) communication to the location of the vehicle. This can also involve the vehicle moving closer to the officer, when possible, if the vehicle reaches the meeting place first and the officer has not yet arrived, but when travelable paths for the vehicle continue to exist between the current vehicle location and the officer location.

FIG. 4 shows an illustrative example of a tracking engagement process. In this example, the process can determine if an officer is proximate at 401 and outside of the vehicle. This process can engage tracking of a suspect, to attempt illuminate the suspect using vehicle lighting, at the onset of a chase and any time once the chase has begun. In this example, the process uses officer proximity as an indicator to look for a suspect. Since the process may have limited capability for determining a suspect from other passersby, but can track, for example, running people or people behaving in a manner defined as evasively, the process may assume for tracking purposes that when the officer is within a predefined distance of the vehicle at 401, other non-officer parties moving evasively (erratically) or running may constitute suspects. Further refinement is also possible depending on sensing and time of day, so that, for example, the officer could speak a description of clothing with sufficient sensing the vehicle could search for someone wearing matching clothing. Other variations are also possible.

In this example, while officer proximity is not a necessity, it is used to circumvent having the vehicle continually identify non-suspect parties based on, for example, movement (e.g., joggers, kids playing, etc.), while the vehicle follows the officer.

Once the officer is suitably proximate the vehicle uses sensors to search the surrounding area at 403 for movement that matches predefined evasive behavior, and can also search for people of certain heights, wearing certain clothing, crouching or hiding, etc. IR and other sensors that can sense "behind" objects may be included in the vehicle sensors. If the vehicle detects such a party at 405, it can perform a match at 407 to confirm the detection based on any suitable AI matching provided thereto (e.g., eliminating, for example, small children, dogs, etc. as likely non-suspects regardless of behavioral matches).

The vehicle can then aim directional and aimable vehicle lighting (steerable headlamps or headlamp beams, search lights, spot lights, etc.) at a suspect location at 409 if the time of day requires illumination. The vehicle 100 can also issue a command such as "Stop!" at 411 through external vehicle speakers, which may also be directionally aimed or output in a direction of the detected party.

Figure 5:
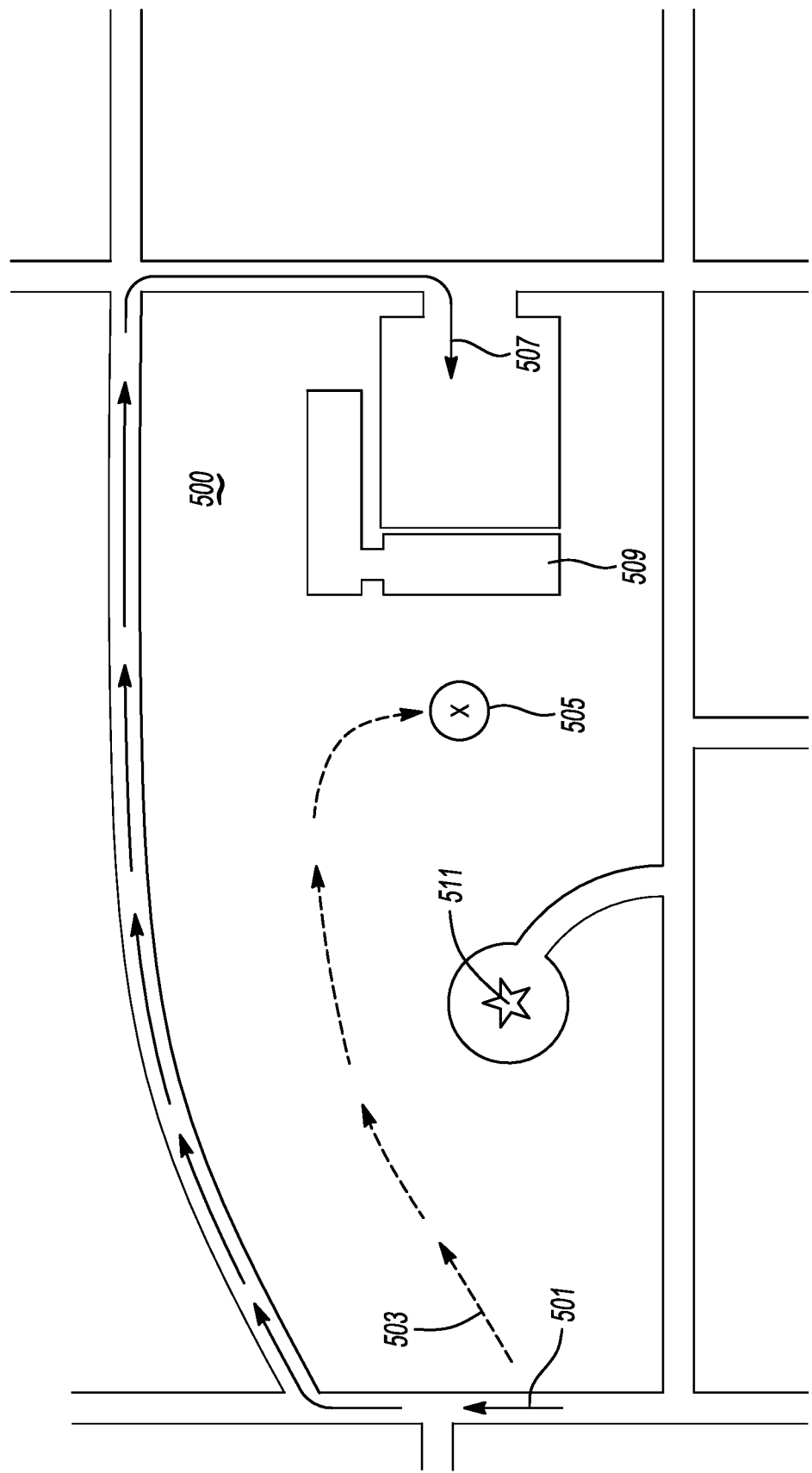
FIG. 5 shows an illustrative example of an officer path traveling offroad and a vehicle path tracking the projected vectors of the officer path.

FIG. 5 shows an illustrative example of an officer path traveling offroad and a vehicle path tracking the projected vectors of the officer path. This is an example where a vehicle may not be able to immediately follow a pursuing officer, and may have to attempt to accommodate officer pathing based on some predictions made by the vehicle (or the cloud) about likely final destinations of the officer when exiting the park shown.

In this example, the vehicle and officer both start the chase where arrows 501 and 503 begin. The officer pursues a suspect through the park 500, where a vehicle cannot follow. The park includes a roundabout parking area and several buildings 509 adjoining a parking lot.

The officer path 503 leads through the park. As the vehicle receives coordinates, the westward travel is apparent, and the vehicle parallels the officer along path 501 on the north side of the park. When the officer turns south at stops at 505, the vehicle pulls into parking lot 507 because that is the closest parking that is available at the moment and the closest the vehicle can get to the stopped officer location.

Then the vehicle 100 may attempt to plan an officer path to the stopped location, and realize that building 509 presents an impediment. Searching the area, the vehicle could elect to move to a point on the street on the southern side of the park and/or pull into the circular area with parking location 511. So as not to interfere with traffic, the vehicle can drive to 511 and send the officer instructions to transport the suspect to 511.

If the suspect eluded the officer, the officer may elect to walk to location 507 instead and cancel the vehicle movement. The vehicle could provide updates to the officer letting the officer know where the vehicle was located, so the officer could provide ancillary control instructions if desired.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
    one or more processors configured to:
    monitor an ongoing enforcement situation using one or more sensors provided to the vehicle;
    determine, based on the monitoring and sensor data of the one or more sensors, that a foot pursuit has begun;
    receive a location signal from a location-providing device carried by at least one entity involved in the situation;
    determine a street route for the vehicle that follows movement of the entity by using streets travelable by the vehicle, based on a plurality of locations received from the location-providing device;
    determine that a series of received locations of the plurality of locations indicate pursuit through an area defined as an area unsuitable for travel by the vehicle and responsively plan a street route intercept path based on at least one projected exit region of the entity from the area, the intercept path including coordinates placing the vehicle within a predefined distance of at least one location within the exit region;
    include the street route intercept path in the street route; and
    automatically and autonomously control the vehicle to follow the determined street route including the street route intercept path.

2. The vehicle of claim 1, wherein the one or more sensors include a camera at least either included in the vehicle or worn by an entity involved in the situation.

3. The vehicle of claim 1, wherein the one or more sensors include an audible input at least either included in the vehicle and capable of detecting audio external to the vehicle or worn by an entity involved in the situation.

4. The vehicle of claim 1, wherein the determination that the foot pursuit has begun is based on detection of at least one specific phrase detected using an audio sensor as one of the one or more sensors.

5. The vehicle of claim 1, wherein the determination that the foot pursuit has begun is based on detection of at least one predefined type of human movement occurring in the situation detected using a camera as one of the one or more sensors.

6. The vehicle of claim 1, wherein the one or more processors are further configured to choose one or more streets for the street route that include coordinates within a predefined distance from a given location of the plurality of the locations, such that were the vehicle to arrive at the coordinates and were the entity not to move from the given location, the vehicle would be within the predefined distance of the given location while at the coordinates.

7. The vehicle of claim 1, wherein the projected exit region is based at least in part on a vector derived from a plurality of successive locations, indicating a heading of the pursuit.

8. The vehicle of claim 1, wherein the projected exit region is based at least in part on map data indicating obstructions of at least certain perimeter regions of the area, and the exit region includes an area not obstructed by the indicated obstructions.

9. The vehicle of claim 1, wherein the street route intercept path includes a street path around an outer edge of the area that keeps the vehicle as close to consecutive locations of the plurality of locations as possible while still maintaining a vehicle speed below a predefined travel speed.

10. A non-transitory computer-readable storage medium storing instructions that, when executed by a vehicle computer including one or more processors, cause the one or more processors to be configured to:
    monitor an ongoing enforcement situation using one or more sensors provided to the vehicle;
    determine, based on the monitoring and sensor data of the one or more sensors, that a foot pursuit has begun;
    receive a location signal from a location-providing device carried by at least one entity involved in the situation;
    determine that a series of received locations of the plurality of locations indicate pursuit through an area defined as an area unsuitable for travel by the vehicle and responsively plan a street route intercept path including a street route for the vehicle that follows movement of the entity by using streets travelable by the vehicle, based on a plurality of locations received from the location-providing device and based on at least one projected exit region of the entity from the area, the intercept path including coordinates placing the vehicle within a predefined distance of at least one location within the exit region; and
    automatically and autonomously control the vehicle to follow the determined street route intercept path.

11. The storage medium of claim 10, wherein the one or more sensors include a camera at least either included in the vehicle or worn by an entity involved in the situation.

12. The storage medium of claim 10, wherein the one or more sensors include an audible input at least either included in the vehicle and capable of detecting audio external to the vehicle or worn by an entity involved in the situation.

13. The storage medium of claim 10, wherein the determination that the foot pursuit has begun is based on detection of at least one specific phrase detected using an audio sensor as one of the one or more sensors.

14. The storage medium of claim 10, wherein the determination that the foot pursuit has begun is based on detection of at least one predefined type of human movement occurring in the situation detected using a camera as one of the one or more sensors.

15. The storage medium of claim 10, wherein the one or more processors are further configured to choose streets for the street route that include coordinates within a predefined distance from a given location of the plurality of the locations, such that were the vehicle to arrive at the coordinates and were the entity not to move from the given location, the vehicle would be within the predefined distance of the given location while at the coordinates.

16. The storage medium of claim 10, wherein the projected exit region is based at least in part on a vector derived from a plurality of successive locations, indicating a heading of the pursuit and wherein the projected exit region is based at least in part on map data indicating obstructions of at least certain perimeter regions of the area, and the exit region includes an area not obstructed by the indicated obstructions and nearest to a perimeter point towards which the heading heads.

17. The storage medium of claim 10, wherein the street route intercept path includes a street path around an outer edge of the area that keeps the vehicle as close to consecutive locations of the plurality of locations as possible while still maintaining a vehicle speed below a predefined travel speed.

* * * * *